United States Patent
Wakabayashi

(10) Patent No.: US 9,561,758 B2
(45) Date of Patent: Feb. 7, 2017

(54) WIRE HARNESS WITH TWO EXTERNAL MULTI-DIAMETER TUBES AND TWIST INDICATOR DEVICE

(71) Applicant: SUMITOMO WIRING SYSTEMS, LTD., Mie (JP)

(72) Inventor: Masataka Wakabayashi, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 35 days.

(21) Appl. No.: 14/657,473

(22) Filed: Mar. 13, 2015

(65) Prior Publication Data

US 2015/0266435 A1 Sep. 24, 2015

(30) Foreign Application Priority Data

Mar. 20, 2014 (JP) .................................. 2014-058697

(51) Int. Cl.
*B60R 16/02* (2006.01)
*H02G 3/04* (2006.01)
*H02G 3/06* (2006.01)

(52) U.S. Cl.
CPC ......... *B60R 16/0215* (2013.01); *H02G 3/0481* (2013.01); *H02G 3/06* (2013.01)

(58) Field of Classification Search
None
See application file for complete search history.

(56) References Cited

U.S. PATENT DOCUMENTS

| 5,623,169 A * | 4/1997 | Sugimoto | B60R 16/0207 307/10.1 |
| 5,911,450 A * | 6/1999 | Shibata | B60R 16/0207 174/112 |
| 6,603,074 B2 * | 8/2003 | Seo | H02G 3/0468 174/102 D |

(Continued)

FOREIGN PATENT DOCUMENTS

| JP | 2002-354628 | 12/2002 |
| JP | 2004-072932 | 3/2004 |

(Continued)

*Primary Examiner* — Chau N Nguyen
*Assistant Examiner* — Muhammed Azam
(74) *Attorney, Agent, or Firm* — Greenblum & Bernstein, P.L.C.

(57) ABSTRACT

A wire harness includes: an electrical wire group including a main electrical wire section, a first branch electrical wire section, and a second branch electrical wire section; a small-diameter tubular exterior member configured to cover the main electrical wire section in the circumferential direction, and on whose base end section side the first branch electrical wire section is located; a large-diameter tubular exterior member configured to cover the main electrical wire section in the circumferential direction, and on whose base end section side the second branch electrical wire section is located; first and second tape-fixing sections; and twist indicator that is provided at a position at which the small-diameter tubular exterior member and the large-diameter tubular exterior member overlap each other, and is configured to indicate the degree of twist of the main electrical wire section between the first branch electrical wire section and the second branch electrical wire section.

3 Claims, 6 Drawing Sheets

(56) References Cited

U.S. PATENT DOCUMENTS

| | | | | |
|---|---|---|---|---|
| 7,602,134 | B1* | 10/2009 | Taylor | F16M 11/08 310/232 |
| 9,337,634 | B2* | 5/2016 | Sato | H02G 3/0481 |
| 2002/0023770 | A1* | 2/2002 | Motokawa | B60R 16/0207 174/72 A |
| 2002/0028600 | A1* | 3/2002 | Kondo | B60R 16/0207 439/502 |
| 2002/0166692 | A1* | 11/2002 | Mercier | H02G 3/06 174/72 A |
| 2002/0179318 | A1 | 12/2002 | Seo | |
| 2003/0023947 | A1* | 1/2003 | Sakakura | B60R 16/0207 716/126 |
| 2006/0235644 | A1* | 10/2006 | Sawai | G06F 17/5018 702/151 |
| 2008/0009175 | A1* | 1/2008 | Kamenoue | B60R 16/0222 439/397 |
| 2008/0093521 | A1* | 4/2008 | Doi | H02G 3/30 248/231.9 |
| 2008/0115969 | A1* | 5/2008 | Micu | B60R 16/0215 174/72 A |
| 2008/0210725 | A1* | 9/2008 | Birtwisle | B60R 9/04 224/309 |
| 2008/0312536 | A1* | 12/2008 | Dala-Krishna | A61B 8/12 600/459 |
| 2009/0098764 | A1* | 4/2009 | Janos | F21S 2/00 439/501 |
| 2010/0122451 | A1* | 5/2010 | Yang | G06F 17/5009 29/703 |
| 2010/0122831 | A1* | 5/2010 | Watanabe | H01B 7/426 174/107 |
| 2011/0011625 | A1* | 1/2011 | Okuhara | B60R 16/0222 174/152 G |
| 2011/0073351 | A1* | 3/2011 | Okuhara | B60R 16/0222 174/152 G |
| 2011/0198110 | A1* | 8/2011 | Fujita | B60R 16/0222 174/153 G |
| 2011/0244747 | A1* | 10/2011 | Ushikai | B60R 16/0207 442/302 |
| 2012/0068456 | A1* | 3/2012 | Smith | H02G 3/0691 285/307 |
| 2012/0217041 | A1* | 8/2012 | Agusa | B60R 16/0222 174/153 G |
| 2012/0298404 | A1* | 11/2012 | Tokunaga | B60R 16/0215 174/135 |
| 2013/0008709 | A1* | 1/2013 | Suzuki | H02G 3/22 174/650 |
| 2013/0112473 | A1* | 5/2013 | Toyama | B60R 16/0215 174/350 |
| 2013/0264114 | A1* | 10/2013 | Toyama | B60R 16/0207 174/72 A |
| 2015/0024615 | A1* | 1/2015 | Lindblom | H01R 13/625 439/121 |
| 2016/0107587 | A1* | 4/2016 | Kasuya | B60R 16/0215 174/72 A |

FOREIGN PATENT DOCUMENTS

| | | |
|---|---|---|
| JP | 2012-217286 | 11/2012 |
| JP | 2013-51800 | 3/2013 |
| WO | 2013/031261 | 3/2013 |

* cited by examiner

WIRE HARNESS WITH TWO EXTERNAL MULTI-DIAMETER TUBES AND TWIST INDICATOR DEVICE

TECHNICAL FIELD

The present invention relates to a wire harness.

BACKGROUND ART

Conventionally, as a wire harness that is arranged in an automobile, a wire harness is known that includes: an electrical wire group including a main electrical wire section and branch electrical wire sections that are branched from the main electrical wire section; and a tubular exterior member such as a corrugated tube that covers the main electrical wire section in the circumferential direction (see, for example, JP 2002-354628A).

FIG. 6 shows a wire harness disclosed in JP 2002-354628A. In FIG. 6, the wire harness 100 includes: an electrical wire group 10 that includes a main electrical wire section 11, a first branch electrical wire section 12, and a second branch electrical wire section 13; a tubular exterior member 101; a first tape-fixing section 102; and a second tape-fixing section 103. The main electrical wire section 11, the first branch electrical wire section 12, and the second branch electrical wire section 13 are bundled with adhesive tape (not shown).

The electrical wire group 10 is configured to be fixed to the vehicle body panel via clips (not shown) that are provided at predetermined positions on the main electrical wire section 11, the first branch electrical wire section 12, and the second branch electrical wire section 13, and connected to various electronic devices (not shown) and the like that are mounted in an automobile via connectors (not shown) that are provided at the ends of the main electrical wire section 11, the first branch electrical wire section 12, and the second branch electrical wire section 13.

The tubular exterior member 101 covers the portion of the main electrical wire section 11 that is located between the first branch electrical wire section 12 and the second branch electrical wire section 13.

The first tape-fixing section 102 is obtained by winding adhesive tape diagonally around the base end section of the tubular exterior member 101, the first branch electrical wire section 12, and the main electrical wire section 11 so that they are combined together. The second tape-fixing section 103 is obtained by winding adhesive tape diagonally around the other end section of the tubular exterior member 101, the second branch electrical wire section 13, and the main electrical wire section 11 so that they are combined together.

JP 2002-354628A is an example of related art.

SUMMARY OF THE INVENTION

However, once the conventional wire harness 100 is removed from a drawing board for manufacture, the portion of the main electrical wire section 11 that is located between the first branch electrical wire section 12 and the second branch electrical wire section 13 is often twisted, due to the high flexibility of the electrical wire group 10, during the transport process for delivery of the wire harness 100 or when the wire harness 100 is arranged in an automobile, and if an operator tries to arrange the wire harness 100 without eliminating the twist, this may cause a situation in which the clips are positioned on a side away from the vehicle body panel, making it impossible to arrange the wire harness 100.

In the case where the operator determines that the main electrical wire section 11 is twisted at the time of arrangement of the wire harness 100 in the automobile, even if he or she tries to untwist and arrange the main electrical wire section 11 as needed during the arrangement operation, he or she cannot determine how much and in which direction the main electrical wire section 11 is twisted, but can only determine the state of the twist after attempting the arrangement operation, causing the disadvantage that the arrangement operation may stop.

The present invention was made in order to solve the above-described problem, and it is an object of the present invention to provide a wire harness that indicates the degree of a twist of a main electrical wire section that is occurring between two adjacent branch electrical wire sections in an operation for arranging the wire harness in an automobile.

In order to achieve the above-described object, the wire harness according to the present invention is configured to include: an electrical wire group that includes a main electrical wire section, and a first branch electrical wire section and a second branch electrical wire section that are branched from the main electrical wire section, the first branch electrical wire section and the second branch electrical wire section being arranged at a distance from each other in a direction in which the main electrical wire section extends; a small-diameter tubular exterior member that is configured to cover the main electrical wire section in a circumferential direction, the small-diameter tubular exterior member having a base end section on a side on which the first branch electrical wire section is located and a projecting end section that is located between the first branch electrical wire section and the second branch electrical wire section; a large-diameter tubular exterior member that is configured to cover the main electrical wire section in the circumferential direction, the large-diameter tubular exterior member having a base end section on a side on which the second branch electrical wire section is located and a projecting end section that is located between the first branch electrical wire section and the second branch electrical wire section and covers the projecting end section of the small-diameter tubular exterior member in the circumferential direction; a first tape-fixing section that fixes the small-diameter tubular exterior member, the first branch electrical wire section, and the main electrical wire section together, by tape being wound around the base end section of the small-diameter tubular exterior member, the first branch electrical wire section, and the main electrical wire section; a second tape-fixing section that fixes the large-diameter tubular exterior member, the second branch electrical wire section, and the main electrical wire section together, by tape being wound around the base end section of the large-diameter tubular exterior member, the second branch electrical wire section, and the main electrical wire section; and twist indicator that is provided at a position at which the small-diameter tubular exterior member and the large-diameter tubular exterior member overlap each other, and is configured to indicate the degree of a twist of the main electrical wire section that is occurring between the first branch electrical wire section and the second branch electrical wire section.

According to this configuration, in the wire harness of the present invention, if the main electrical wire section is twisted between the first branch electrical wire section and the second branch electrical wire section, the degree of the twist of the main electrical wire section is indicated by the twist indicator. Therefore, when arranging the wire harness in an automobile, an operator can check whether or not the main electrical wire section is twisted.

Accordingly, when mounting the wire harness of the present invention on the vehicle body panel, the operator first views the twist indicator, and if twisting of the main electrical wire section is observed, the operator untwists the main electrical wire section. Then, the wire harness is fixed to the vehicle body panel using a clip that is provided on the exterior member in the vicinity of one of the first branch electrical wire section and the second branch electrical wire section, and subsequently using a clip that is provided on the exterior member in the vicinity of the other one of the first branch electrical wire section and the second branch electrical wire section, and thereby it is possible to fix the wire harness to the vehicle body panel such that the main electrical wire section is not twisted between the first branch electrical wire section and the second branch electrical wire section.

In the wire harness having the above-described configuration, the twist indicator is preferably configured to include any one of a scale section and an indicator section that is provided on the projecting end section of the small-diameter tubular exterior member, and the other of the scale section and the indicator section that is provided on the projecting end section of the large-diameter tubular exterior member.

According to this configuration, in the wire harness of the present invention, if the main electrical wire section is twisted between the first branch electrical wire section and the second branch electrical wire section, the position on the scale section that is indicated by the indicator section represents the degree of the twist of the main electrical wire section.

In the wire harness having the above-described configuration, the twist indicator is preferably configured to include the scale section that is drawn on the projecting end section of the small-diameter tubular exterior member and a window section serving as the indicator section, the window section being formed in the projecting end section of the large-diameter tubular exterior member.

According to this configuration, in the wire harness of the present invention, if the main electrical wire section is twisted between the first branch electrical wire section and the second branch electrical wire section, the degree of the twist of the main electrical wire section is indicated by the scale section drawn on the small-diameter tubular exterior member and the window section formed in the large-diameter tubular exterior member.

Furthermore, with the wire harness according to the present invention, the twist of the main electrical wire section that is occurring between the first branch electrical wire section and the second branch electrical wire section is eliminated by the operator moving the small-diameter tubular exterior member and the large-diameter tubular exterior member relatively to each other in the circumferential direction so that the degree of the twist of the main electrical wire section that is indicated by the scale section drawn on the small-diameter tubular exterior member and the window section formed in the large-diameter tubular exterior member is zero. Therefore, it is possible to arrange the wire harness in an automobile in a favorable condition.

According to the present invention, it is possible to provide a wire harness that can indicate the degree of a twist of a main electrical wire section that is occurring between two adjacent branch electrical wire sections in an operation for arranging the wire harness in an automobile.

EMBODIMENTS OF THE INVENTION

Hereinafter, an embodiment of a wire harness according to the present invention will be described with reference to the drawings.

Figure 1:
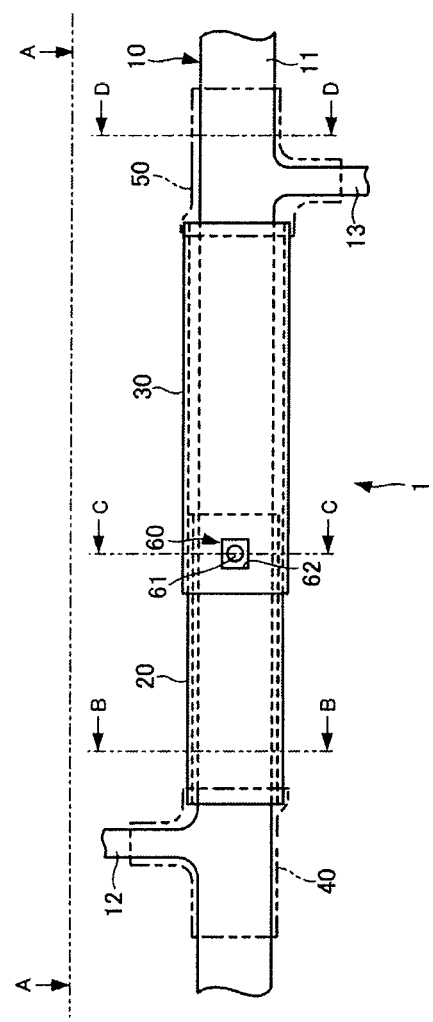
FIG. 1 is a front view showing a wire harness according to an embodiment of the present invention.

As shown in FIG. 1, a wire harness 1 according to the present embodiment includes an electrical wire group 10, a small-diameter tubular exterior member 20, a large-diameter tubular exterior member 30, a first tape-fixing section 40, a second tape-fixing section 50, and twist indicator 60.

Figure 6:
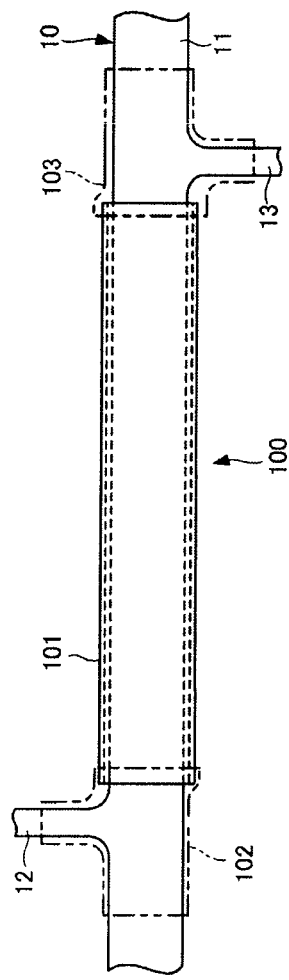
FIG. 6 is a front view showing a conventional wire harness.

Similarly to the foregoing electrical wire group shown in FIG. 6, the electrical wire group 10 includes a main electrical wire section 11, a first branch electrical wire section 12 that is branched from the predetermined position on the main electrical wire section 11, and a second branch electrical wire section 13 that is branched from the main electrical wire section 11 at a position distanced from the first branch electrical wire section 12 in the direction in which the main electrical wire section 11 extends.

Figure 2:
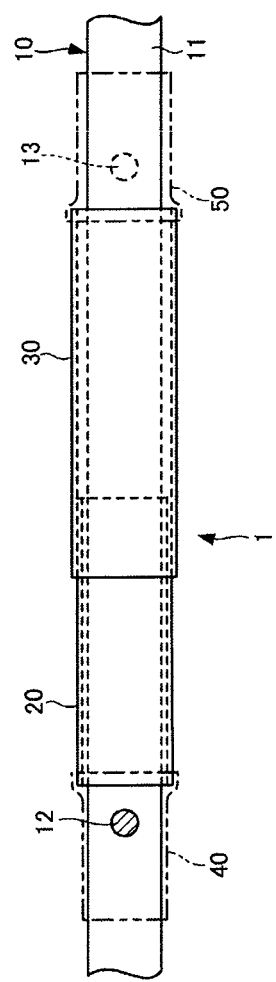
FIG. 2 is a diagram viewed along the arrow A-A of FIG. 1.
Figure 3:
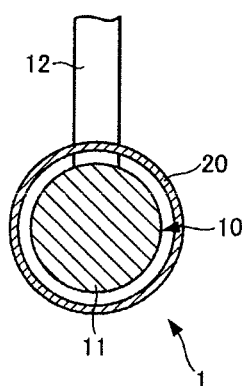
FIG. 3 is a cross-sectional view taken along the arrow B-B of FIG. 1.

As shown in FIGS. 2 and 3, the small-diameter tubular exterior member 20 covers the main electrical wire section 11 in the circumferential direction, and has a base end section on the side on which the first branch electrical wire section 12 is located and a projecting end section that is opposite to the base end section and located between the first branch electrical wire section 12 and the second branch electrical wire section 13.

Figure 4:
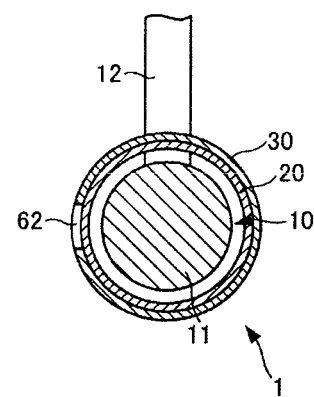
FIG. 4 is a cross-sectional view taken along the arrow C-C of FIG. 1.
Figure 5:
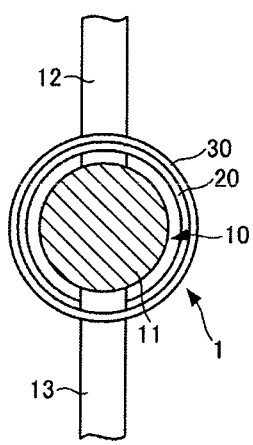
FIG. 5 is a cross-sectional view taken along the arrow D-D of FIG. 1.

As shown in FIGS. 2, 4, and 5, the large-diameter tubular exterior member 30 covers the main electrical wire section 11 in the circumferential direction, and has a base end section on the side on which the second branch electrical wire section 13 is located and a projecting end section that is opposite to the base end section and located between the first branch electrical wire section 12 and the second branch electrical wire section 13.

The first tape-fixing section 40 fixes the small-diameter tubular exterior member 20, the first branch electrical wire section 12, and the main electrical wire section 11 together, by adhesive tape being wound around the base end section of the small-diameter tubular exterior member 20, the first branch electrical wire section 12, and the main electrical wire section 11.

The second tape-fixing section 50 fixes the large-diameter tubular exterior member 30, the second branch electrical wire section 13, and the main electrical wire section 11 together, by adhesive tape being wound around the base end section of the large-diameter tubular exterior member 30, the second branch electrical wire section 13, and the main electrical wire section 11.

The twist indicator 60 includes, as shown in FIGS. 1 and 4, a scale section 61 that includes a circular figure drawn on the projecting end section of the small-diameter tubular exterior member 20, and an indicator section 62 that is constituted by a window section formed in the projecting end section of the large-diameter tubular exterior member 30.

Furthermore, the scale section 61 includes: a pitch scale in the shape of a ruler that is drawn on the outer part of the projecting end section of the small-diameter tubular exterior member 20 and extends in the circumferential direction; one arrow that is drawn on the outer part of the projecting end section of the small-diameter tubular exterior member 20 and extends in one circumferential direction from the border of the FIG. 61; and another arrow that is drawn on the outer part of the projecting end section of the small-diameter tubular exterior member 20 and extends in the other circumferential direction from the border of the FIG. 61. The one arrow and the other arrow are painted in different colors.

The twist indicator 60 is configured such that if the main electrical wire section 11 is twisted between the first branch electrical wire section 12 and the second branch electrical wire section 13, the colored circular figure (hereinafter, referred to as "zero twist position figure") of the scale section 61, which shows a position at which no twist occurs, is deviated from the center of the window section 62, and if the main electrical wire section 11 is not twisted between the first branch electrical wire section 12 and the second branch electrical wire section 13, the zero twist position figure of the scale section 61 is positioned at the center of the window section 62.

The twist indicator 60 is configured to, if the main electrical wire section 11 is twisted between the first branch electrical wire section 12 and the second branch electrical wire section 13, indicate the degree of the twist of the main electrical wire section 11 that is occurring between the first branch electrical wire section 12 and the second branch electrical wire section 13, as a displacement amount of the pitch scale with respect to the window section 62.

The twist indicator 60 is configured such that the one arrow appears in the window section 62 if a twist in one circumferential direction occurs in the portion of the main electrical wire section 11 that is located between the first branch electrical wire section 12 and the second branch electrical wire section 13, and the other arrow appears in the window section 62 if a twist in the other circumferential direction occurs in the portion of the main electrical wire section 11 that is located between the first branch electrical wire section 12 and the second branch electrical wire section 13.

In the wire harness 1, if the main electrical wire section 11 is twisted between the first branch electrical wire section 12 and the second branch electrical wire section 13, the zero twist position figure of the scale section 61 is deviated from the center of the window section 62, and the degree of the twist of the main electrical wire section 11 that is occurring between the first branch electrical wire section 12 and the second branch electrical wire section 13 is indicated as a displacement amount of the pitch scale with respect to the window section 62.

Furthermore, in the wire harness 1, if the main electrical wire section 11 is twisted between the first branch electrical wire section 12 and the second branch electrical wire section 13, the one arrow or the other arrow appears in the window section 62, showing the direction of the twist of the main electrical wire section 11 that is occurring between the first branch electrical wire section 12 and the second branch electrical wire section 13.

Accordingly, when mounting the wire harness 1 of the present embodiment on the vehicle body panel, an operator checks for the zero twist position figure of the scale section 61 that is visible through the window section 62 when the main electrical wire section 11 is not twisted. When the zero twist position figure of the scale section 61 is not visible, the operator can find out the direction and the degree of the twist of the main electrical wire section 11 based on the arrow that appeared in the window section 62 and the displacement amount of the pitch scale with respect to the window section 62, and thus can untwist the main electrical wire section 11.

When the main electrical wire section 11 is untwisted, and then the portion of the main electrical wire section 11 that is located between the first branch electrical wire section 12 and the second branch electrical wire section 13 is fixed to the vehicle body panel using clips (not shown) provided on the main electrical wire section 11, it is possible to fix the wire harness to the vehicle body panel such that the main electrical wire section 11 is not twisted between the first branch electrical wire section 12 and the second branch electrical wire section 13.

The present invention is not limited to the foregoing embodiment, and the technical scope of the present invention that is described in the Claims encompasses design modifications that do not depart from the spirit of the invention.

The twist indicator may also have a configuration in which a pitch scale in the shape of a ruler is drawn, as the scale section 61, on the outer part of the projecting end section of the small-diameter tubular exterior member 20, and a marker line for specifying the position in the pitch scale is drawn, as the indicator section 62, on the outer part of the projecting end section of the large-diameter tubular exterior member 30. Furthermore, the twist indicator may also have a configuration in which a pitch scale in the shape of a ruler is drawn, as the scale section 61, on the outer part of the projecting end section of the large-diameter tubular exterior member, and a marker line for specifying the position in the pitch scale is drawn, as the indicator section 62, on the outer part of the projecting end section of the small-diameter tubular exterior member.

As described above, the wire harness according to the present invention has an effect of being able to indicate the degree of a twist of the main electrical wire section that is occurring between two adjacent branch electrical wire sections in the operation for arranging the wire harness in an automobile, and the present invention is useful for various types of wire harnesses.

LIST OF REFERENCE NUMERALS

1 Wire harness
10 Electrical wire group
11 Main electrical wire section
12 First branch electrical wire section
13 Second branch electrical wire section
20 Small-diameter tubular exterior member
30 Large-diameter tubular exterior member
40 First tape-fixing section
50 Second tape-fixing section
60 Indicator
61 Scale section
62 Window section (indicator section)

What is claimed is:
1. A wire harness comprising:
an electrical wire group that includes a main electrical wire section, and a first branch electrical wire section and a second branch electrical wire section that are branched from the main electrical wire section, the first branch electrical wire section and the second branch electrical wire section being arranged at a distance from each other in a direction in which the main electrical wire section extends;

a small-diameter tubular exterior member that is configured to cover the main electrical wire section in a circumferential direction, the small-diameter tubular exterior member having a base end portion on a side on which the first branch electrical wire section is located and a projecting end portion that is located between the first branch electrical wire section and the second branch electrical wire section;

a large-diameter tubular exterior member that is configured to cover the main electrical wire section in the circumferential direction, the large-diameter tubular exterior member having a base end portion on a side on which the second branch electrical wire section is located and a projecting end portion that is located between the first branch electrical wire section and the second branch electrical wire section and covers the projecting end portion of the small-diameter tubular exterior member in the circumferential direction;

a first tape-fixing section that fixes the small-diameter tubular exterior member, the first branch electrical wire section, and the main electrical wire section together, by tape being wound around the base end portion of the small-diameter tubular exterior member, the first branch electrical wire section, and the main electrical wire section;

a second tape-fixing section that fixes the large-diameter tubular exterior member, the second branch electrical wire section, and the main electrical wire section together, by tape being wound around the base end portion of the large-diameter tubular exterior member, the second branch electrical wire section, and the main electrical wire section;

wherein the projecting end portion of the large-diameter tubular exterior member and the projecting end portion of the small-diameter tubular exterior member partially overlap to define a partially overlapping region; and a twist indicator that is provided at the partially overlapping region, and is configured to indicate the degree of a twist of the main electrical wire section that exists between the first branch electrical wire section and the second branch electrical wire section.

2. The wire harness according to claim 1, wherein the twist indicator includes a scale section and an indicator section, one of the scale section and the indicator section being provided on the projecting end portion of the small-diameter tubular exterior member, and the other one of the scale section and the indicator section being provided on the projecting end portion of the large-diameter tubular exterior member.

3. The wire harness according to claim 1, wherein the twist indicator includes a scale section that is drawn on the projecting end portion of the small-diameter tubular exterior member, and a window section serving as an indicator section, the window section being formed in the projecting end portion of the large-diameter tubular exterior member.

* * * * *